Figure 1:
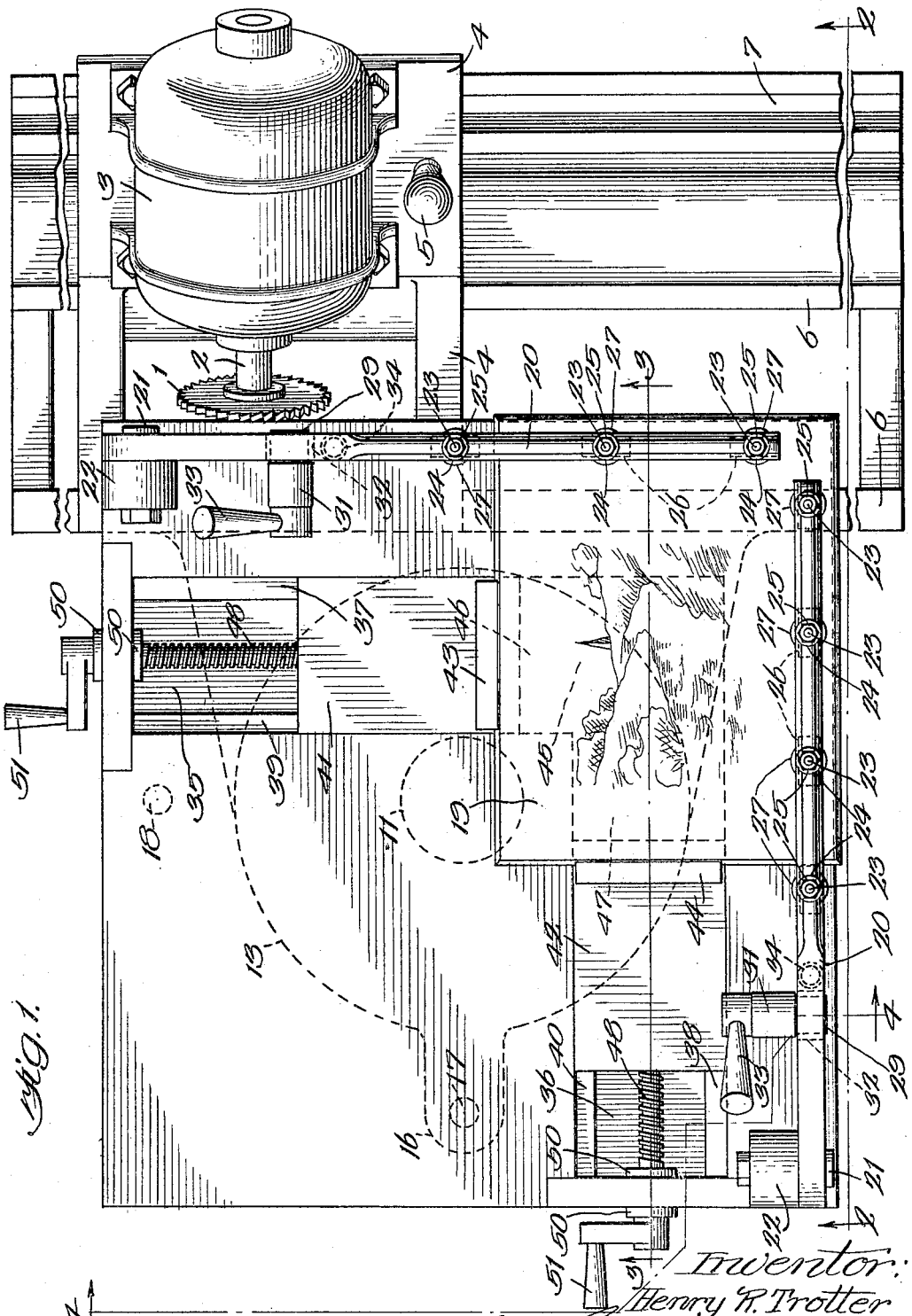

Inventor:
Henry R. Trotter

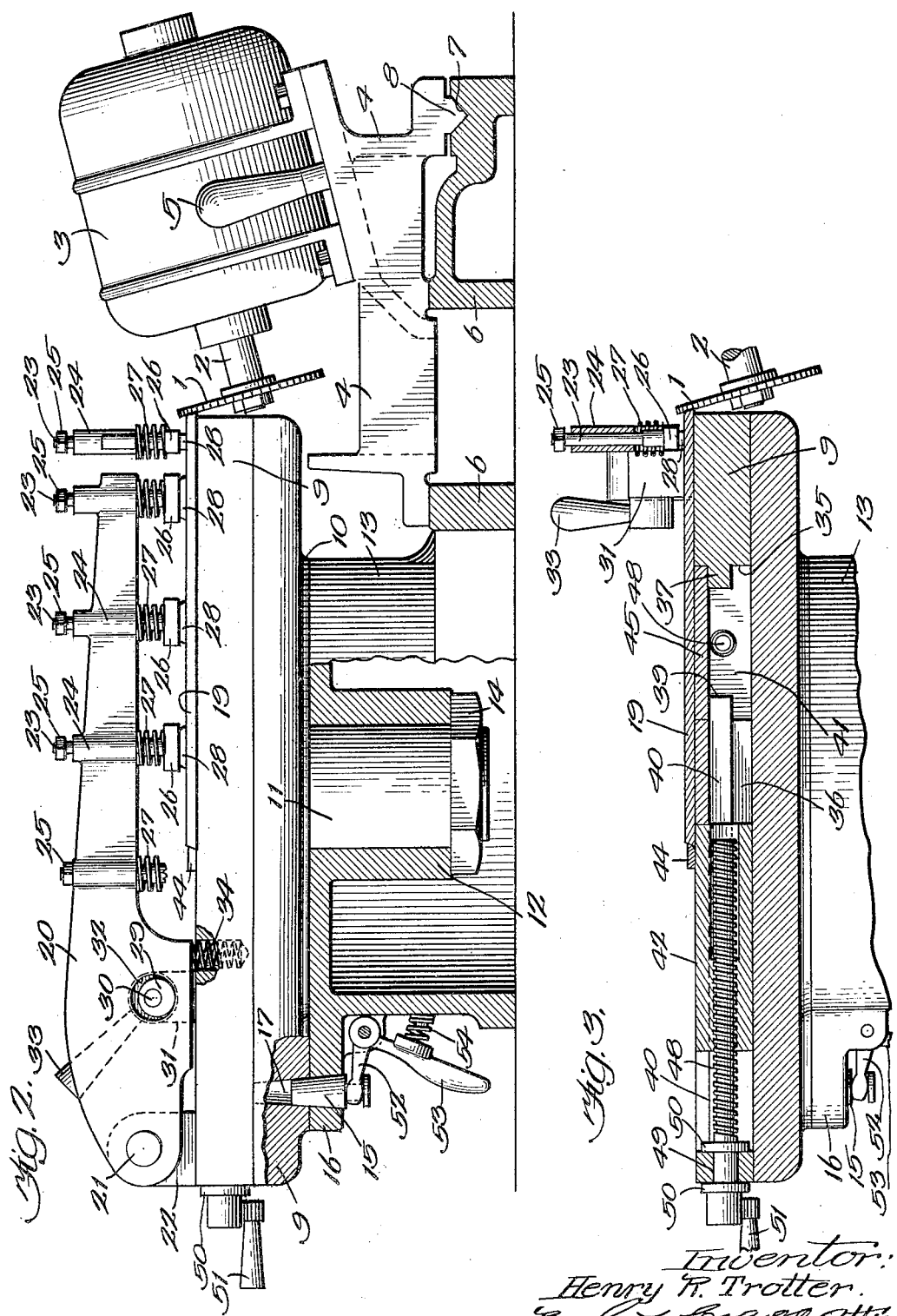

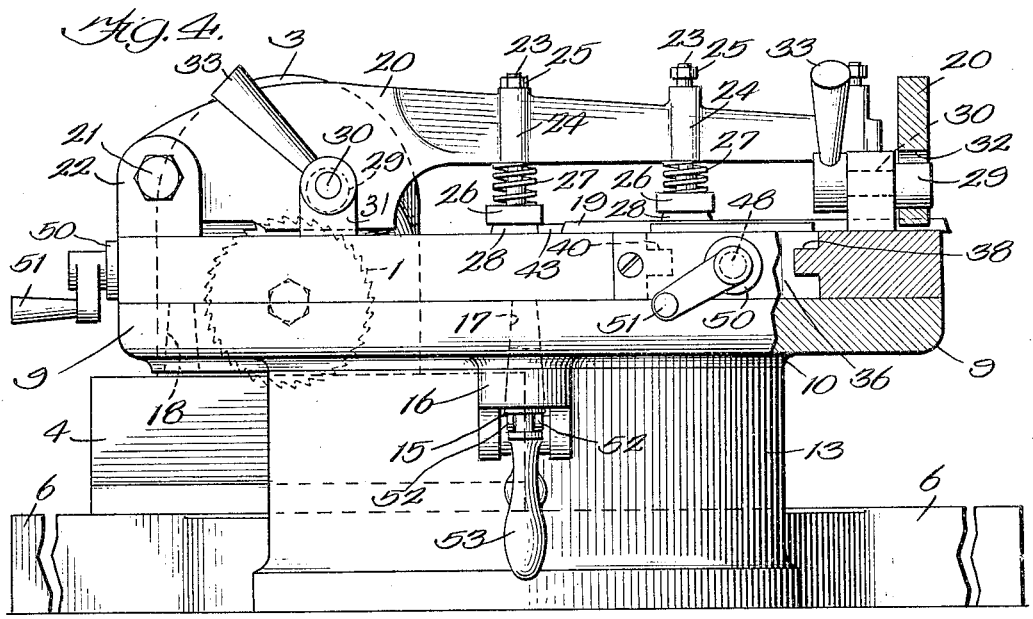
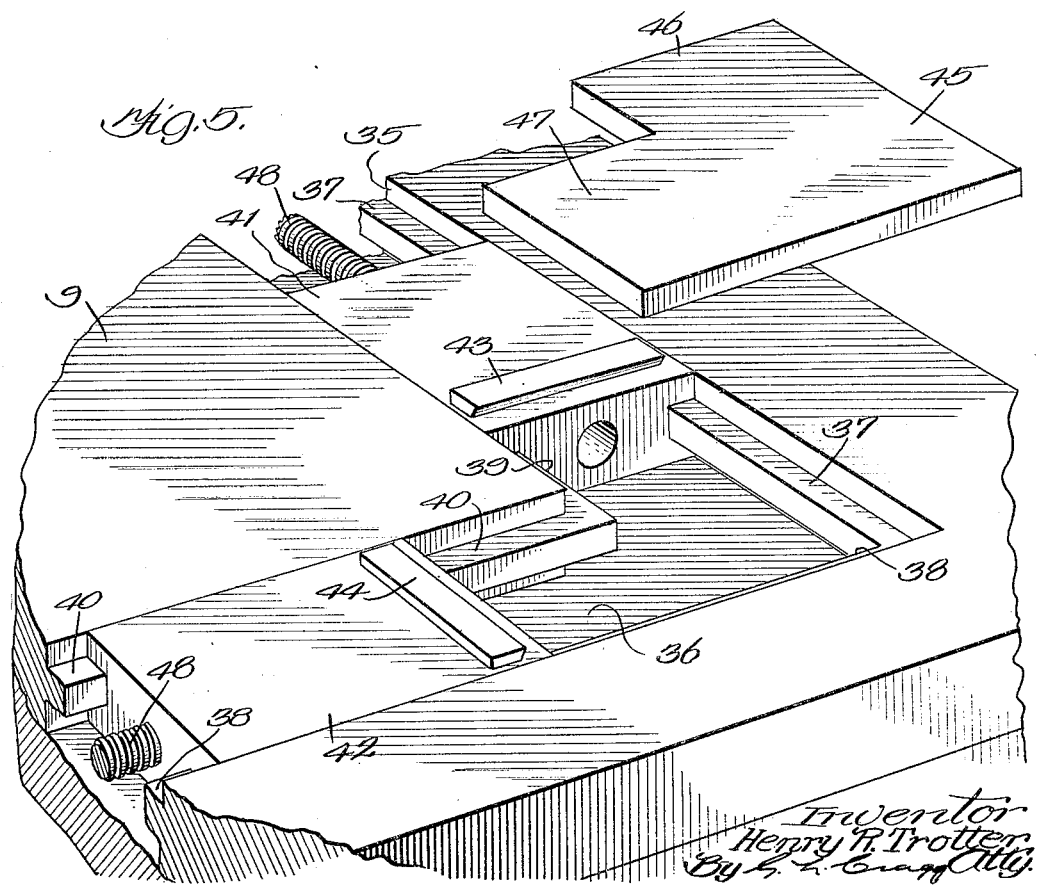

Patented May 2, 1933

1,906,877

UNITED STATES PATENT OFFICE

HENRY R. TROTTER, OF CHICAGO, ILLINOIS, ASSIGNOR TO HACKER MANUFACTURING CO., OF CHICAGO, ILLINOIS, A CORPORATION OF ILLINOIS

PRINTING PLATE TRIMMING MACHINE

Application filed July 26, 1928. Serial No. 295,398.

My invention relates to machines employing work holders, the machine of my invention being inclusive of a work holding bed having a groove in which a clamping block is received and in which a spacer of selected size is also receivable, one of these two elements, preferably the clamping block, having a work engaging formation to hold the work in selected position with respect to the cutter or other tool which is to operate upon the work.

My invention is of particular service when embodied in a machine for trimming printing plates, the preferred form of machine employed for this purpose being inclusive of a circular saw which is employed to trim the edges of the plates, a carriage upon which the saw is revoluble, a guide defining a line of travel for the carriage which is abreast of the plane of rotation of the saw, a work holding table positioned to present work to the teeth of the saw and mounted to turn whereby different sides of the work may be presented to the saw, said table having a groove therein which has two angularly related branches, two gauge blocks, one in and movable along each of said groove branches and each having a work positioning formation thereon, a spacer also received in said groove and having two branches, one in each groove branch, means for clamping said gauge blocks against said spacer, and means for holding said table in one position with the work between the saw and one of said work position formations and in another position with the work between the saw and the other work engaging formation.

The invention will be more fully explained in connection with the accompanying drawings in which Fig. 1 is a plan view of the preferred embodiment thereof; Fig. 2 is a sectional view on line 2—2 of Fig. 1; Fig. 3 is a sectional view on line 3—3 of Fig. 1; Fig. 4 is a sectional view on line 4—4 of Fig. 1; and Fig. 5 is a perspective view illustrating some of the parts more in detail.

A circular saw 1 is illustrated, this saw being carried upon a shaft 2 which may be driven by an electric motor 3. The saw and the motor for driving it are provided upon a carriage 4 which is equipped with a handle 5 whereby the carriage may be moved back and forth upon the bed 6 of the machine, this bed being inclusive of a guide 7 having a groove which receives the V shaped rib 8 of the carriage, the groove being parallel with the plane of rotation of the saw whereby the carriage is limited to a line of travel which is parallel with the plane of rotation of the saw or in which such line of travel is abreast of such plane of rotation, the invention not being limited to exact parallelism between the plane of rotation of the saw and the line or path in which the saw is bodily moved.

A work holding table 9 is shown as being rectangular in contour and as having an underlying circular enlargement 10 which is coaxial with the shaft 11 that is carried by and projects beneath the table and is journalled within an upright bearing 12 which is formed upon the bed 13, the beds 6 and 13 being desirably integrally formed in one casting. A nut 14 is screwed upon the lower end of the shaft 11 and engages the bottom face of the upright bearing 12 whereby the work holding table is held in one plane whether it is in motion or at rest. A tapered pin 15 is passed through a tapering hole in the flange 16 of the bed 13 and into either of the two tapering holes 17 and 18 formed in the work holding table, the holes 17 and 18 being, in the embodiment of the invention illustrated, equidistant from the axis of the shaft 11 and upon lines that radiate from the axis of said shaft at right angles to each other. These radiating lines that pass through the centers of the holes 17 and 18 are respectively perpendicular to adjacent sides of the rectangular work table. One of these two lines is parallel with the guide 7 and the other is perpendicular to this guide.

The work to be cut is illustrated as being in the form of a printing plate 19 which is suitably held by means of clamps, to be described. When the pin 15 is in the hole 17 and the carriage 4 for the saw is moved in the guide 7, one side of said plate is trimmed. When the pin 15 is withdrawn from the hole 17 and the work holding table is turned to enable said pin to be received in the hole 18, a side of the plate 19 adjacent that which was previously cut may itself be cut in a similar manner with the result that these two plate sides are in exact right angular relationship whereafter the remaining two plate sides may be similarly cut to have them in exact right angular relationship, there being means, hereinafter to be described, whereby the plate is so held in its second position as to cause the plate to be of accurate rectangular shape after the saw has trimmed all of the sides of the plate.

The means for holding the plate 19 upon the work holding table is desirably inclusive of any two clamping devices of similar construction, a description of one being applicable to both. Each clamping device illustrated includes an arm 20 which is pivoted, at one end, upon a pivot bolt 21 which is carried by a bracket 22 that projects upwardly from the work holding table. A number of spaced apart rods 23 pass through and are slidable within sleeves 24 that are integrally formed with said arms, there being nuts 25 upon the upper ends of said rods to limit the extent to which the rods may be lowered. Enlargements 26 are provided upon the lower ends of the rods 23, there being coiled springs 27 around the rods 23 and between these enlargements and the arm which carries said rods. Presser feet 28 are universally joined with and within the abutments of the enlargements 26 so that when the arm 20 is lowered, the bottom faces of these presser feet may be in full engagement with the top of the printing plate.

A cam disc 29 is eccentrically mounted upon a shaft 30, this shaft being carried in the upper end of a bracket 31 which is carried by and projects upwardly from the work holding table. A circular hole 32 is provided in the arm 20 which is coaxial with the shaft 30. The hole 32 receives the disc 29 which engages the rim of the hole 32 at one point and is clear of it elsewhere. A handle 33 is secured to the shaft 30. When the arm has been lowered to a position in which the presser feet engage the printing plate 28, the cam 29 is in engagement with an upper portion of the rim of the hole 32 so that the contact between the presser feet and the printing plate is initially light. Said plate is then firmly bound upon the work holding table by turning the disc 29 to bring its point of greatest eccentricity below the shaft 30 so as to force said arm to its lowermost position in which the presser feet will be held in firm engagement with the printing plate by the forcibly depressed arm acting through the springs 27, the springs preventing the plate from being injured. When the plate is to be shifted or withdrawn, the handle 33 is restored to the position first described to elevate the arm 20, such elevation being assisted by the spring 34 which is carried by the work holding table and presses upwardly against the bottom of the arm. The edges of printing plates are usually beveled and, in such event, the carriage 4 is so shaped as to cause the plane of the saw 1 to be oblique to the work holding top face of the work holding table, as is shown most clearly in Figs. 2 and 3, the arrangement being such that the edge of the printing plate 19 is properly presented to the teeth of the saw as the saw is bodily moved along the edge of the printing plate that is being cut.

In order that the same machine may be employed in connection with printing plates or other work of different sizes, I form the work holding bed with a groove that enables an adjustment to adapt work of different sizes to the machine, this groove, in the embodiment of the invention illustrated, being inclusive of two angularly related branches 35, 36, these groove branches being illustrated as being at right angles to each other. Guiding ribs or feathers 37 and 38 are in the outer sides of the groove branches and preferably merge, as illustrated in Fig. 5. Other guiding ribs or feathers 39 and 40 are in the inner sides of the groove branches and also preferably merge. Clamping or gauge blocks 41 and 42 are respectively received in the groove branches 35 and 36 and receive the guiding ribs or feathers that are in these groove branches. Said groove branches are desirably positioned similarly to the adjacent sides of the rectangular work holding table so as to be angular to or parallel with the plane of the saw according to the particular hole 17 or 18 in which the pin 15 is received.

Work engaging ribs 43 and 44 are provided upon the gauge or clamping blocks 41 and 42, these ribs being at right angles to the groove branches in which said blocks are respectively received so that one of these ribs is parallel with the saw and the other is perpendicular thereto. A spacer 45 is provided with two branches 46 and 47 that are respectively also receivable within the groove branches 35 and 36, these spacer branches serving to define the spacings between the ribs 43 and 44 and the sides of the table and to define the space that is to intervene between the saw and each work positioning rib so that the plate is accurately trimmed to size when the third and fourth sides thereof have been cut, the first and second sides thereof having been cut when the blocks 41 and 42 are further withdrawn, a larger spacer then being employed than the spacer 45 which is used in the final two cutting operations. The two clamps which hold the work plate in position remain in their clamping position until the adjacent two sides of the printing plate are trimmed whereafter the plate is released from the clamps and is repositioned with its freshly cut sides in engagement with the work holding ribs 43 and 44 which have been newly positioned so that when the final two cuts are made, the printing plate will be brought to exact size.

Any suitable means may be employed for operating the clamping blocks 41 and 42. I have shown clamping screws 48 which are mounted to turn in bearings 49 which are interposed between flanges 50 upon said screws whereby the screws are prevented from moving axially while they are being rotated. Cranks 51 are connected with the outer ends of the screws 48 whereby the screws may be readily turned to advance the corresponding clamping or gauge blocks with which they are in threaded connection.

Any suitable means may be employed for inserting and withdrawing the pin 15 within and from the holes 17 and 18. I have shown the lower end of this pin as being formed with an annular groove which receives the forked end of a bell crank lever 52, the other end of this bell crank lever being in the shape of a handle 53. When the bell crank lever is turned counterclockwise, the pin is withdrawn permitting the work holding table to be turned. A spring 54 is interposed between the handle 53 and the bed 13 and serves to move the bell crank lever in a clockwise direction whenever one or the other of the two holes 17 or 18 has been brought into register with the pin 15, the pin being thus automatically inserted within such a hole.

Changes may be made without departing from the invention.

Having thus described my invention, I claim:

The combination with a work holding table; of two angularly related grooves in said table, said grooves merging in a right angle; feathers in said grooves extending lengthwise thereof and also merging; gauge blocks flush with said table adjustable in said grooves and receiving said feathers; a spacer having two right angularly related branches receivable in said groove, said spacer being supported on said feathers to be flush with said table and said gauge blocks and abutting the gauge blocks; work engaging ribs on the gauge blocks engaging two respective sides of the work, said work resting on said spacer; and angularly related clamping means engaging the respective margins of the work opposite each said gauge block.

In witness whereof, I hereunto subscribe my name.

HENRY R. TROTTER.